United States Patent [19]
Adrain

[11] Patent Number: 5,523,948
[45] Date of Patent: *Jun. 4, 1996

[54] APPARATUS AND METHOD FOR MODIFYING CONTROL OF AN ORIGINALLY MANUFACTURED ENGINE CONTROL MODULE

[76] Inventor: John B. Adrain, 723 Ocean View Dr., Port Hueneme, Calif. 93041

[ * ] Notice: The term of this patent shall not extend beyond the expiration date of Pat. No. 5,293,317.

[21] Appl. No.: 219,121
[22] Filed: Mar. 28, 1994

Related U.S. Application Data

[63] Continuation-in-part of Ser. No. 205,686, Mar. 3, 1994, Pat. No. 5,446,665, which is a continuation of Ser. No. 33,040, Mar. 18, 1993, Pat. No. 5,293,317, which is a continuation of Ser. No. 830,552, Jan. 30, 1992, Pat. No. 5,200,900.

[51] Int. Cl.⁶ ............................ G06G 7/76; F02M 51/00
[52] U.S. Cl. ...................... 364/431.01; 364/431.12; 364/431.04; 364/424.01; 123/486; 123/480
[58] Field of Search ................... 364/431.01–431.12, 364/425, 132, 134; 123/486, 399, 417, 480, 488; 73/117.3, 116, 117.2, 118.2; 180/287; 307/10, 10.3, 10.2

[56] References Cited

U.S. PATENT DOCUMENTS 4,084,240  4/1978  Lappington .................. 364/431.04
4,277,829  7/1981  Tokuda et al. ................ 364/431.05
4,556,943  12/1985 Pauwels et al. ............... 364/431.12
4,677,558  6/1987  Bohmler et al. ............... 364/431.04
4,730,256  3/1988  Niimi et al. .................. 364/431.12
4,908,792  3/1990  Przybyla et al. .............. 364/431.12
5,200,900  4/1993  Adrian et al. ................. 364/431.12
5,293,317  3/1994  Adrian et al. ................. 364/431.12

Primary Examiner—Kevin J. Teska
Assistant Examiner—Jacques H. Louis-Jacques
Attorney, Agent, or Firm—Daniel L. Dawes

[57] ABSTRACT

Conventional control modules, such as vehicle control modules, VCM, powertrain control modules, PCM, or engine control modules, ECM, provided with diagnostic and/or emulation ports, or simply with portions of the wiring harnesses which are devoted to diagnostic or emulation functions, are retrofitted with an adapter module which allows the originally manufactured control module to be reconfigured to operate in a dramatically different protocol without any system redesign. The memory within the originally manufactured control module can be disabled, bypassed or rewritten to store a new program contained in one of a plurality of programs in an adapter memory or contained in one of a plurality of memories in the adapter module. One application includes retrofitting conventionally manufactured gasoline or diesel vehicles to run on alternative fuel, such as propane, compressed natural gas or liquefied natural gas and the like.

20 Claims, 1 Drawing Sheet

APPARATUS AND METHOD FOR MODIFYING CONTROL OF AN ORIGINALLY MANUFACTURED ENGINE CONTROL MODULE

RELATED APPLICATIONS

The present application is a continuation-in-part application of application Ser. No. 08/205,686 filed Mar. 3, 1994, now U.S. Pat. No. 5,446,665 entitled "Automotive Multiple Memory Selector Apparatus," which is a continuation of Ser. No. 033,040 filed Mar. 18, 1993 now U.S. Pat. No. 5,293,317, which in turn is a continuation of Ser. No. 830552 filed Jan. 30, 1992,now U.S. Pat. No. 5,200,900, each of which are expressly incorporated herein by reference.

BACKGROUND OF THE INVENTION

1. Field of the Invention

The invention relates to the field of electronic controls for automobiles, and more particularly to the modification of the originally installed and manufactured electronic control modules for internal combustion engines.

2. Description of the Prior Art

Most automobiles have engine functions controlled by onboard computer chips. Air/fuel mixture, timing, temperature and RPM are input into an onboard computer which then calculates the desired engine timing, fuel injection and other control outputs according to a prestored fixed program.

In addition to control of engine parameters, control of anti-theft features, choices of fuel in an alternatively fueled vehicle, and a wide variety of passenger comfort, and safety functions are similarly controlled by onboard computers. In particular, the computer which controls the engine performance is variously referred to as an engine control module, ECM, vehicle control module, VCM, powertrain control module, PCM, or engine control unit, ECU, are used to control the engine, transmission and braking functions among others. For the purposes of this specification all types of electronic control circuits which are used to control the engine will be collectively defined as "engine control modules".

In virtually all engine control modules, an input/output port or means of some type is provided which allows communication between the onboard computer and exterior sources. The input/output port is sometimes referred to as a diagnostic port and is used primarily for engine, powertrain or transmission diagnostics and error detection, or is referenced as emulation port which may be used both for diagnostic purposes and to input various test protocols into the onboard computer for purposes either testing that computer or other automotive systems controlled by the onboard computer.

Regardless of how sophisticated or intelligent the onboard computer system program is, it invariably arises that there are additional functions which should or can be performed, or that the vehicle in certain applications will need to be customized to perform differently than originally intended or designed. For example, most engines and systems are originally devised to burn one type of fuel, such as gasoline or diesel. In certain applications, the same engine can be converted through appropriate conversion of the computer system to burn alternative types of fuel such as propane, compressed natural gas or liquefied natural gas. In fact, the vehicle must be reconfigured in the field, or possibly even when operating, to switch between alternative fuels or various alternative fuels either automatically through sensor feedbacks, preprogrammed feedbacks or through manual control.

What is needed then is a simple system which can be retrofitted to an originally manufactured engine control modules, which are mass produced originally for other purposes and functions. The method must not only be simple and economic, but also must be able to convert the originally manufactured engine control systems without substantial modification or alteration of the original designs.

BRIEF SUMMARY OF THE INVENTION

The invention is an improvement in a vehicle having a predetermined combination of operational elements for controlling vehicular operation according to at least one originally provided program. The predetermined combination of operational elements is defined in a fixed system having a bus with a predetermined operable design for operation of the vehicle. The elements of the system are controlled by an electronic control module according to the originally provided program. The electronic control module is coupled to the bus and is exteriorly accessible for at least diagnostic purposes. Typically, exterior access is achieved either through a diagnostic or emulation port, or directly through a portion of the engine wiring harness. The improvement comprises a universal module externally coupled to the bus for arbitrarily reconfiguring programmed control of the electronic control module regardless of the design of the system in which the electronic control module is employed. The universal module permits selection among a plurality of additional operational protocols not originally included within the fixed system design. The universal module comprises a plurality of preprogrammed memories. Each of the memories stores at least one additional program for use in controlling operation of the vehicle in a distinguishable protocol in addition to those provided by the originally provided program and in lieu of control provided by the originally provided program. A control circuit is coupled only to the plurality of preprogrammed memories and selectively communicates one of the plurality of preprogrammed memories to the electronic control module. The operation of the vehicle is changed by the control while the vehicle is in transit and thereafter becomes controlled according to the additional program in the selected preprogrammed memory in lieu of the originally provided program. As a result, the vehicle is caused to operate in a protocol selected from among a plurality of alternatives available in the plurality of preprogrammed memories.

The control circuit comprises a circuit for sensing a plurality of operating conditions. The selected protocol causes the vehicle to operate in a manner consistent with the sensed operating conditions according to the selected protocol. The control circuit also comprises a circuit for selectively operating the vehicle without selection of one of the plurality of preprogrammed memories.

In one embodiment the control comprises a circuit for disabling the originally provided program memory and controlling the computer according to one of the plurality of preprogrammed memories.

In another embodiment the control circuit comprises a circuit for erasing the originally provided memory and writing a new program into the originally provided memory from one of the preprogrammed memories.

In the illustrated embodiment the vehicle includes an engine and wherein the programs stored within the plurality of memories are operating parameters for engine performance according to fuel burned within the engine.

More specifically the control circuit comprises logic circuitry for generating a plurality of memory enable signals and a control switch or circuitry for allowing selection of one of the plurality of memory enable signals. The selected memory enable signal is coupled to the plurality of memories for selecting one of the memories for operation of the vehicle.

The invention is alternatively characterized as an improved automotive computer for controlling engine performance comprising a first computer for providing control signals to the engine. The control signals comprise engine operating parameters. A plurality of memories are coupled to the first computer for providing a plurality of originally provided programmed modes for operating the engine. A bus is coupled to the first computer and the plurality of memories. A diagnostic/emulation port can be coupled to the bus to permit communication with the bus from exterior sources. The first computer, bus and plurality of memories are combined to provide a fixed system of control to the engine. The fixed system has an originally provided fixed selection of programmed modes for operating the engine. A control circuit is coupled to the bus through the diagnostic/emulation port to select one of an additional plurality of programmed modes from the plurality of memories for operating the engine. The selected one of the additional plurality of programmed modes is not one of the originally included ones in the plurality of memories. The memory having the additional programmed modes is coupled to the first computer to control the operation of the engine during actual transit. The engine or other function is controlled according to selection among the plurality of programmed modes. As a result, engine operation is made responsive to the control.

The control circuit in one illustrated embodiment comprises a second computer coupled to the plurality of memories and to the first computer. The second computer selectively generates a plurality of memory select commands. The control circuit comprises a circuit for allowing selection of one of the memory select commands according to the sensed operation of the vehicle.

In another embodiment the automotive computer control system further comprises a plurality of sensors coupled to the second computer for communication to the first computer according to the selected one of the modes corresponding to a selected one of the memories.

The improved automotive computer control system also further comprises an input circuit for loading operating parameters into the second computer for communication to the first computer for control of the engine.

The engine is originally provided with the first computer coupled to one of the plurality of memories. The remainder of the plurality of memories and the control circuit are coupled to the first computer and the one originally provided memory through the diagnostic/emulation port. The diagnostic/emulation port is also originally provided with the first computer and the one memory. As a result, retrofitting the enhanced automotive computer control system to the originally provided first computer control circuit and the one memory is simplified.

The invention is also a method of controlling an automotive computer comprising the steps of providing control signals to an engine from a first computer. The control signals comprise engine operating parameters. A plurality of originally provided programmed modes are provided for operating the engine from at least one originally provided memory coupled to the first computer. A superseding signal is communicated to a bus coupled to the first computer and the plurality of memories through a diagnostic/emulation port or harness coupled to the bus from an adapter module. The superseding signal alters control of the engine by the first computer. The engine is selectively controlled by means of the first computer through a selected one of an additional plurality of programmed modes provided by the adapter module. The selected one of the additional plurality of programmed modes is not originally included in the originally provided memory.

In one embodiment the step of selectively controlling the engine is automatically performed in response to detection of a condition exterior to the engine, such as the need to make a fuel conversion.

The invention and its various embodiments may be better visualized by turning to the following drawings wherein like elements are referenced by like numerals.

The invention and its various embodiments may now be understood by turning to the following detailed description.

DETAILED DESCRIPTION OF THE PREFERRED EMBODIMENTS

Conventional control modules, such as vehicle control modules, VCM, powertrain control modules, PCM, or engine control modules, ECM, provided with diagnostic and/or emulation ports, or simply with portions of the wiring harnesses which are devoted to diagnostic or emulation functions, are retrofitted with an adapter module which allows the originally manufactured control module to be reconfigured to operate in a dramatically different protocol without any system redesign. The memory within the originally manufactured control module can be disabled, bypassed or rewritten to store a new program contained in one of a plurality of programs in an adapter memory or contained in one of a plurality of memories in the adapter module. One application includes retrofitting conventionally manufactured gasoline or diesel vehicles to run on alternative fuel, such as propane, compressed natural gas or liquefied natural gas and the like.

Figure 1:
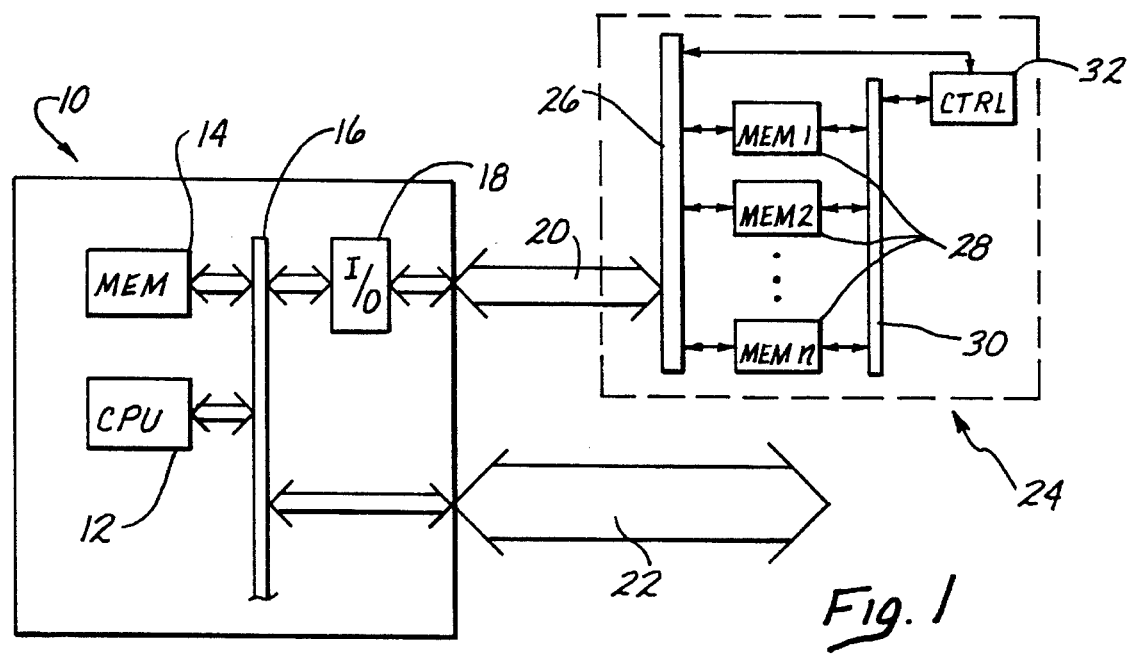
FIG. 1 is a diagrammatic block diagram of a first embodiment of the invention wherein the engine control module, ECM, is accessed through a separate input/output diagnostic/emulation port.

FIG. 1 is a simplified block diagram which illustrates a control module for an internal combustion engine, generally denoted by reference numeral 10, which may be variously designated in the industry as a vehicle control module, VCM, for controlling performance of the engine, transmission and antilock brakes, a powertrain control module, PCM, for controlling the engine and transmission functions, or an engine control module, ECM, for controlling engine performance only. Each of these and similar types of control modules will simply be referenced as engine control module 10 in FIGS. 1 and 2.

In FIG. 1 control module 10 includes a central processing malt 12, CPU, which is coupled to a memory 14 by means of a shared data and address bus 16. A separate input and output port is also coupled to bus 16 and defines an independent diagnostic or emulation port, symbolically denoted by arrow 20. The originally intended purpose of diagnostic/emulation port 20 is to provide a circuit for diagnosing or error checking the various functions which control module 10 is to control, or to input test signals to cause control module 10 or other subsystems within the automobile that control module 10 controls to perform in a predetermined way. The performance of these subsystems can then be checked to determine not the actual functioning of the control module 10, but the subsystem in question.

Bus 16 is also coupled to engine harness 22, which is then hard-wired into the plurality of subsystems which control module 10 is intended to control.

Thus far, the description of control module 10 describes what is conventional and existing in originally manufactured automobiles. It is not the intention of the original design of control module 10 that it be operated in any different mode than the protocol that is stored in memory 14, which may be understood to include a plurality of onboard memory chips or a plurality of programs in a single memory chip.

In any case, the control module adapter of the invention, generally denoted by reference numeral 24, is coupled through diagnostic/emulation port 20 to switch, erase, substitute or otherwise perform the function of memory 14 and/or CPU 12 within control module 10.

For example, in FIG. 1, adapter module 24 is shown as having its own data/address bus 26 coupled to diagnostic/emulation port 20. Bus 26 in turn is coupled to one or more preprogrammed memories 28, which in turn are coupled to an adapter control bus 30 to which a control circuit 32 is connected. Control circuit 32 is also coupled to data/address bus 26 communicated to control module 10. The structure of adapter module 24 can be substantially varied from what is diagrammatically shown in FIG. 1 and may include any of the embodiments described in greater detail in the above-denoted parent applications which are expressly incorporated within the present continuation-in-part application. Therefore, further embodiments and details concerning adapter module 24 will not be provided, it being understood that module 24 may be modified in any one of the ways in which the incorporated specifications provide or suggest.

Figure 2:
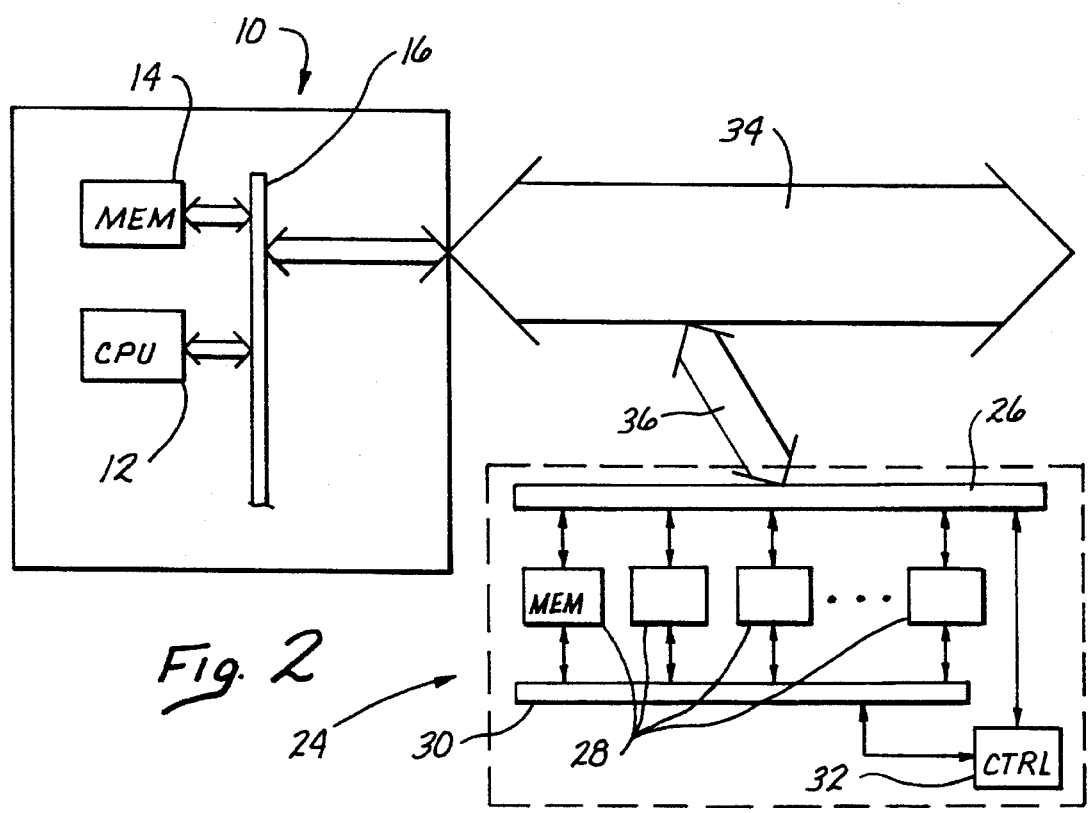
FIG. 2 is a diagrammatic block diagram of another embodiment of the invention wherein the ECM is directly accessed through the factory harness which is coupled to the ECM bus.

FIG. 2 diagrammatically illustrates another embodiment of the invention wherein control module 10 is not provided with a separate input/output diagnostic/emulation port 20 as in the case of FIG. 1, but has harness 34 directly wired into bus 16. A portion 36 of harness 34 is then reserved for what would ordinarily be the similar diagnostic or emulation functions served within control module 10 had control module 10 been provided with a separate port for these functions. Portion 36 of harness 34 is then coupled to bus 26, memories 28, control circuit 32 and control bus 30 in the same manner as previously described in connection with FIG. 1.

The operation of either of the embodiments of FIGS. 1 and 2 may be performed so as to disable memory 14 and to substitute one of the plurality of memories 28 effectively into the operation control module 10.

Alternatively, an instruction can be loaded in to control module 10 from adapter module 24 so that CPU 12 reads directly from a memory from adapter module 24 instead of memory 14, although memory 14 may remain enabled.

It is within the contemplation of the invention that even CPU 12 will be entirely or partially disabled with respect to all or some of its functions and the disabled functions and added functions directly controlled by adapter module 24 through control circuit 32.

Still further, memory 14 may be an erasable memory and through appropriate instructions loaded in through adapter module 24, the contents of memory 14 may be erased and/or downloaded into one of memories 28, while the contents in another one of memories 28 is uploaded into the now erased memory 14 so that memory 14 is essentially rewritten and CPU 12 controlled accordingly by the newly written program in memory 14. The newly written program may be only temporarily stored within memory 14 and the old program may be restored upon predetermined conditions, or the memory swap may be more permanent.

There is no limitation to the type of applications in which modifications to control module 10 may be made according to the present invention. For example, one of the presently most useful applications is in alternatively fueled vehicles. A sensor, measuring the level of one type of fuel in a tank or some other condition, can be automatically triggered and provided as an input signal to adapter module 24. Alternatively, the signal may come into control module 10 through harness 22 or 34 in the embodiments of FIGS. 1 and 2, respectively, and then be detected by adapter module 24 on bus 16. In any case, when the trigger even occurs to switch fuels, adapter module 24 can be manually or automatically triggered to selectively disable memory 14, if necessary, and provide access to CPU 12 to one of memories 28 to retime the engine and remeter the fuel injection to switch to the new fuel type. Alternatively, according to the invention, memory 14 may be rewritten as described above.

Adaptive module 24 thus allows mass produced control modules 10 and the vehicles in which such modules 10 are installed, which vehicles were never intended to be operated on dual fuels, to be inexpensively and easily converted to dual fuel vehicles by inclusion of adapter module 24, which connects into control module 10 either through the diagnostic/emulation port 20 or through the appropriate portion 36 of harness 34, both of which are provided in the originally manufactured equipment. A vehicle conversion is thus effected insofar as engine control module 10 is concerned with no redesign of the system whatsoever.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

We claim:

1. An improvement in a vehicle having a predetermined combination of operational elements for controlling vehicular operation according to at least one originally provided program, said predetermined combination of operational elements being defined in a fixed system having a bus with a predetermined operable design for operation of said vehicle, said operational elements of said system being controlled by an electronic control module according to said originally provided program, said electronic control module being coupled to said bus and exteriorly accessible for at least diagnostic purposes, said improvement comprising:

a module externally coupled to said bus for arbitrarily reconfiguring a programmed control of said electronic control module in which said electronic control module is employed, said module for use in selecting at least one additional operational protocol not originally included within said fixed system design, said module comprising:

at least one preprogrammed memory, said preprogrammed memory for storing at least one additional program for use in controlling operation of said vehicle in a distinguishable protocol in addition to those provided by said originally provided program and in lieu of control provided by said originally provided program; and a control coupled only to said preprogrammed memory for selectively communicating said preprogrammed memory to said electronic control module, operation of said vehicle being changed by said control according to said additional program in said selected preprogrammed memory in lieu of said originally provided program, whereby said vehicle is caused to operate in a protocol selected from at least one alternative available in said preprogrammed memory.

2. The improvement of claim 1 wherein said control comprises means for sensing a plurality of operating conditions, said selected protocol causing said vehicle to operate in a manner consistent with said sensed operating conditions according to said selected protocol.

3. The improvement of claim 1 wherein said control comprises means for selectively operating said vehicle without selection of said at least one preprogrammed memory.

4. The improvement of claim I wherein said control comprises means for disabling said originally provided program memory and controlling said computer according to said at least one preprogrammed memory.

5. The improvement of claim 1 wherein said control comprises means for erasing said originally provided memory and writing a new program into said originally provided memory from said at least one preprogrammed memory.

6. The improvement of claim 1 wherein said vehicle includes an engine and wherein said programs stored within said at least one preprogrammed memory are operating parameters for engine performance according to fuel burned within said engine.

7. The improvement of claim 1 wherein said control comprises a computer for generating at least one memory enable signal and a manual control switch means for allowing selection of said at least one memory enable signal, said selected memory enable signal being coupled to said memory for selecting said at least one memory for operation of said vehicle.

8. An improved automotive computer for controlling engine performance comprising:

a first computer for providing control signals to said engine, said control signals comprising engine operating parameters;

at least one memory coupled to said first computer for providing at least one originally provided programmed mode for operating said engine;

a bus coupled to said first computer and said memory;

a diagnostic/emulation port coupled to said bus to permit communication with said bus from exterior sources;

wherein said first computer, bus and memory are combined to provide a fixed system of control to said engine, said fixed system having at least one originally provided fixed programmed mode for operating said engine;

a control coupled to said bus through said diagnostic/emulation port to select at least one additional programmed mode from said memory for operating said engine, said additional programmed mode not being originally included in said memory, said memory having said additional programmed mode being coupled to said first computer to control the operation of said engine according to said programmed mode corresponding to said memory, whereby engine operation is made responsive to said control.

9. The improved automotive computer control system of claim 8 wherein said control comprises a second computer coupled to said plurality of memories and first computer, said second computer for selectively generating a plurality of memory select commands, said control comprising means for allowing selection of one of said memory select commands for coupling to said plurality of memories according to the sensed operation of said vehicle.

10. The improved automotive computer control system of claim 9 further comprising a plurality of sensors coupled to said second computer for communication to said first computer according to said selected one of said modes corresponding to a selected one of said memories.

11. The improved automotive computer control system of claim 9 further comprising input means for loading operating parameters into said second computer for communication to said first computer for control of said engine.

12. The improved automotive computer control system of claim 8 wherein said engine is originally provided with said first computer coupled to one of said plurality of memories, said improved automotive computer comprising other ones of said plurality of memories and said control system are retrofitted by coupling thereto through said diagnostic/emulation port, said other ones of said plurality of memories and said control being coupled to said first computer and said one of said plurality of memories by said bus through said diagnostic/emulation port, said diagnostic/emulation port being originally provided with said first computer and said one of said plurality of memories, whereby retrofitting said improved automotive computer control system to said originally provided first computer control and said one memory is simplified.

13. An automotive computer control system for an engine to control engine performance comprising:

a computer coupled to said engine operative to control operating performance of said engine;

a memory coupled to said computer for storing a plurality of originally provided programs, each of said originally provided programs for use in controlling said operating performance of said engine;

a bus coupling said computer and memory; and a diagnostic/emulation port coupled to said bus for communicating with exterior sources;

wherein said computer, memory, bus and diagnostic/emulation port are combined in a fixed system design;

a control means coupled to said diagnostic/emulation port of said fixed system design for allowing selection of at least one additional program not included as one of said originally provided programs stored within said memory, said selection through said control means designating one of said plurality of originally provided and said at least one additional program for use in controlling said engine during actual transit as may be determined.

14. The automotive computer control system of claim 13 further comprising means for controlling said computer according to a user provided for said engine control program.

15. An improvement in a vehicle having a predetermined combination of operational elements for controlling vehicular operation according to at least one originally provided program, said predetermined combination of operational elements being defined in a fixed system having a bus with a predetermined operable design for operation of said vehicle, said operational elements of said system controlled by an electronic control module according to said originally provided program, said electronic control module being coupled to said bus and exteriorly accessible for at least diagnostic purposes through an engine harness, said improvement comprising:

a module coupled to said bus through said engine harness for arbitrarily reconfiguring programmed control of said electronic control module through said engine harness coupled to said bus in which said electronic control module is employed, said module for permitting selection of at least one additional operational protocol not originally included within said fixed system design, said module comprising:

a plurality of preprogrammed memories, each of said memories for storing at least one additional program for use in controlling operation of said vehicle in a distinguishable protocol in addition to those provided by said originally provided program and in lieu of control provided by said originally provided program; and a control coupled only to said plurality of preprogrammed memories for selectively communicating one of said plurality of preprogrammed memories to said electronic control module, operation of said vehicle being changed by said control and thereafter becomes controlled according to said additional program in said selected preprogrammed memory in lieu of said originally provided program, whereby said vehicle is caused to operate in a protocol selected from among a plurality of alternatives available in said preprogrammed memories.

16. The improvement of claim 15 wherein said control comprises means for disabling said originally provided program memory and controlling said computer according to one of said plurality of preprogrammed memories.

17. The improvement of claim 15 wherein said control comprises means for erasing said originally provided memory and writing a new program into said originally provided memory from one of said preprogrammed memories.

18. The improvement of claim 15 wherein said vehicle includes an engine and wherein said programs stored within said plurality of memories are operating parameters for engine performance according to fuel burned within said engine.

19. A method of controlling an automotive computer comprising the steps of:

providing control signals to an engine from a first computer, said control signals comprising engine operating parameters;

providing at least one originally provided programmed mode for operating said engine from at least one originally provided memory coupled to said first computer;

communicating a superseding signal to a bus coupled to said first computer and said at least one originally provided memory through a diagnostic/emulation port or harness coupled to said bus from an adapter module, said superseding signal to alter control of said engine by said first computer;

selectively controlling said engine by means of said first computer through at least one additional programmed mode provided by said adapter module, said additional programmed mode not being originally included in said originally provided memory.

20. The method of claim 19 wherein said step of selectively controlling said engine is automatically performed in response to detecting a condition exterior to said engine.

* * * * *

UNITED STATES PATENT AND TRADEMARK OFFICE
CERTIFICATE OF CORRECTION

PATENT NO.   : 5,523,948

DATED        : June 4, 1996

INVENTOR(S)  : John B. Adrain

It is certified that error appears in the above-identified patent and that said Letters Patent is hereby corrected as shown below:

Column 7, lines 1-2; delete "in which said electronic control module is employed".

Column 9, lines 18-19; delete "in which said electronic control module is employed".

Signed and Sealed this

Twenty-first Day of January, 1997

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,523,948
DATED : June 4, 1996
INVENTOR(S) : John B. ADRAIN

It is certified that error appears in the above-identified patent and that said Letters Patent is hereby corrected as shown below:

Title page of the patent, section [63], line 4, please insert after "Pat. No. 5,200,900" the following phrase --, which is a file-wrapper continuation of 07/579,072, filed September 6, 1990, now abandoned--.

Signed and Sealed this

First Day of August, 2000

Attest:

Q. TODD DICKINSON

*Attesting Officer*      *Director of Patents and Trademarks*